Dec. 20, 1960    G. R. CONLEY ET AL    2,964,953
CONTROL APPARATUS

Filed March 18, 1959    2 Sheets-Sheet 1

INVENTOR.
GEORGE R. CONLEY
HAROLD K. REBNE
HILLARD JOHN WAGNER
BY Roger W. Jensen
ATTORNEY Dec. 20, 1960   G. R. CONLEY ET AL   2,964,953
CONTROL APPARATUS
Filed March 18, 1959   2 Sheets-Sheet 2

INVENTOR.
GEORGE R. CONLEY
HAROLD K. REBNE
HILLARD JOHN WAGNER
BY
Roger W. Jensen
ATTORNEY

United States Patent Office 2,964,953
Patented Dec. 20, 1960

2,964,953

CONTROL APPARATUS

George R. Conley, Maplewood, Harold K. Rebne, Minneapolis, and Hillard John Wagner, Roseville, Minn., assignors to Minneapolis-Honeywell Regulator Company, Minneapolis, Minn., a corporation of Delaware Filed Mar. 18, 1959, Ser. No. 800,288

3 Claims. (Cl. 74—5.7)

This invention pertains to means for providing rotation between a pair of relatively rotatable members and is especially applicable to the field of gyroscopes.

In many system applications of gyroscopes at the present time there are requirements for having the gyro operative within an extremely short period of time after the start signal is given. In the co-pending application of Jack A. Peterson and H. John Wagner, Serial No. 778,986, filed December 8, 1958 and assigned to the same assignee as the present application, a means is disclosed for driving the rotor or spin element of a gyroscope with compressed fluid means such as compressed nitrogen. This type of apparatus is effective to bring the rotor element up to the desired angular velocity within an extremely short period of time. In the said co-pending application the rotor driving means is shown in combination with a two axis displacement gyro and the supply of compressed fluid is of a relatively small size and is adapted to be expended in a relatively short period of time, the rotor being rapidly brought up to speed and then coasting. For displacement gyroscopes it will be understood that a certain variation in the rate of rotation of the spinning element can be tolerated without significant penalties especially where the gyro is only going to be used in a control sense for a relatively short period of time.

In the field of rate of turn sensing gyroscopes or rate gyroscopes there is a somewhat different situation. By rate of turn gyroscopes is meant a single degree of freedom gimbal mounting a spin motor and with means resiliently restraining the gimbal to a null position. Means are also provided for sensing displacement of the gimbal away from a null or normal position. By very accurately controlling the speed of rotation of the spin element means are provided for measuring very accurately the rate of rotation of the gyroscope about the gyroscope input axis, the input axis being defined as that axis perpendicular to both the gyro spin axis and the gimbal axis which also are perpendicular to each other. There is also a requirement for some system applications to have rate gyroscopes very rapidly brought up to speed and to maintain the speed very accurately at a predetermined value. To use only a compressed fluid driven rotor for rate gyro applications is not completely satisfactory. This is especially true where the supply of compressed fluid is of a relatively small size and where the supply of compressed fluid is subject to a variation in ambient temperature. It will be understood that as the temperature varies the effective pressure of the compressed fluid will also vary. As the pressure of the fluid to the gyro spin motor varies it will be understood that the terminal angular velocity of the spin motor will also vary and for rate gyro applications this means that the sensitivity or response of the device to input rates will vary which understandably is not desirable.

The present invention solves the problem of reliability and accuracy in rate gyroscopes by having a rotor element initially brought up to speed by compressed fluid means and by providing an auxiliary rotor momentum sustaining means which sustains the momentum of the rotor subsequent to the termination of fluid being discharged against the rotor from the compressed fluid means and which will also insure that the rotor element always rotates at a predetermined speed. Thus the present invention combines a compressed fluid means for rotating a rotor element and an electric motor means such as synchronous or induction motors for rotating the element. The invention enjoys the benefits of a compressed fluid rotation producing means for bringing the rotor element up to speed in an extremely short period of time and also enjoys the benefit of having the rotor element rotating at the exact synchronous speed of the synchronous motor means or at a speed slightly less than synchronous speed in the case of an induction motor so that the accuracy of the rate gyro is preserved as compared to a rate gyro wherein the rotor element was rotated by compressed fluid means only. Another aspect of the invention is that the electric motor means may be relatively quite small in size (both physical and from the power consumption standpoint) as compared to prior art electrically driven rate gyroscopes wherein the electric driving means was the only means of imparting rotation to the rotor element. By this is meant that the power input to the electric motor means of the present invention may be kept comparatively low and physically the motor may be made considerably smaller as compared to prior art electric motor type rate gyroscopes because the rotor element inertia and starting friction is overcome and is initially rotated up to or near the desired operating rate of rotation by the compressed fluid rotor rotation means and the electric motor means merely has to sustain rotor speed at the desired rate of rotation. As is well understood by those skilled in the art, the power required to start an electric motor is much greater than that required to sustain rotation. Thus in one embodiment of the invention the electric spin motor means need not be sufficient by itself to bring the rotor element up to speed in a relatively short period of time. This feature which permits the electric sustaining means to be of relatively small size means that the overall size of the gyro does not have to be increased as compared to prior art gyros which merely have one type of rotor impelling means or the other.

It will be understood that the present invention permits an extremely compact, versatile, and accurate rate gyroscope having compressed fluid means for initially bringing the rotor element up to speed in a very short period of time and electric motor means for locking the rotor into the desired running speed and sustaining it at this speed.

It is an object of our invention therefor to provide an improved control apparatus.

A further object of the invention is to provide an improved means for imparting rotation to a rotor element.

Other and more specific objects of the invention including constructional details and the operation of gyroscopes embodying our invention, will be set forth more fully and become apparent from a reading of the following specification and appended claims, in conjunction with the accompanying drawings in which:

Figure 1:
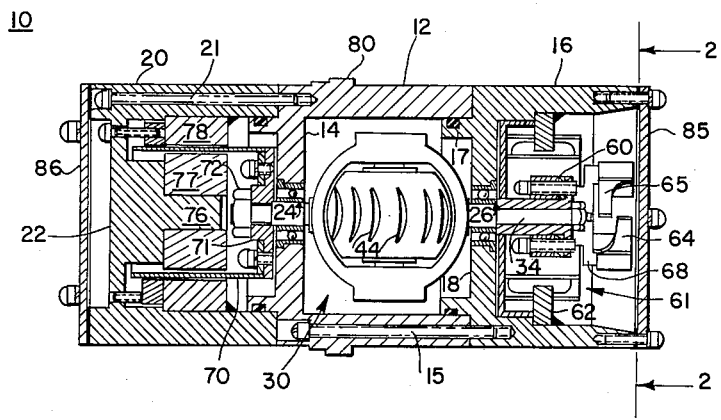
Figure 1 is a cross-sectional view of a rate gyroscope embodying our invention.

Referring now to Figure 1, reference numeral 10 designates a rate gyroscope comprising in part a multisection main housing structure including a central housing member 12 which generally consists of a hollow cylindrically shaped member made out of any suitable material and having one axial end thereof substantially closed off by an end wall 14. The other axial end of the main housing portion 12 is open and fitted into this open end is a first auxiliary housing portion 16 also having a generally hollow cylindrical configuration with an axially extending shoulder part 17 adapted to fit within the main housing 12. Suitable means such as machine screws 15 secure the housing portions 12 and 16 together. One end of the first auxiliary housing 16 is closed off by a wall portion 18, wall portion 18 being immediately adjacent to the main housing portion 12. A second auxiliary housing 20 is also provided and is adapted to be connected by suitable means such as machine screw 21 to the end of the main housing member 12 having the end portion 14. The second auxiliary housing 20 is also a generally hollow cylindrically shaped member of any suitable material and has an open end adjacent to the main housing 21 and has the other end closed off by a symmetrically shaped end wall 22.

Figure 3:
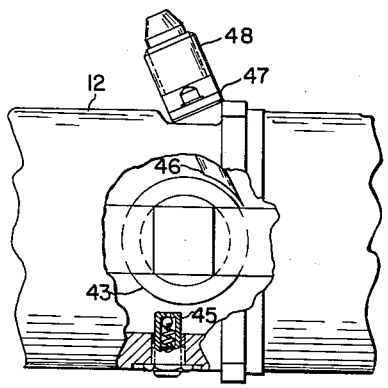
Figure 3 is a view showing the portion of the apparatus shown in Figure 1 with portions cut away to disclose the coaction between the nozzle means and the rotor element.
Figure 4:
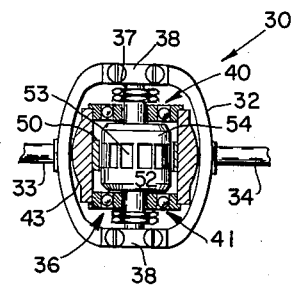
Figure 4 is a cross-sectional view of a portion of the gimbal assembly and rotor element showing in particular the coaction between the stator portion and rotor portion of the electric motor sustaining means.

Suitable central apertures are provided in each of the end wall portions 14 and 18 of the housing portions 12 and 16. Fitted into these central apertures are a pair of bearings 24 and 26 of conventional form having outer races, inner races, with a plurality of ball bearings positioned between said races. Bearing means 24 and 26 define a gimbal axis or output axis for a gimbal assembly generally identified by the reference numeral 30. The gimbal assembly 30 generally includes a rotor supporting gimbal 32 (see Figure 4) which has a pair of diametrically opposite extending shaft portions 33 and 34 adapted to fit within the inner races of the bearing means 24 and 26. It will be understood therefore that the gimbal 32 is supported through the shaft portions 33 and 34 and the bearing means 24 and 26 for rotation about a gimbal axis or output axis. The gimbal assembly 30 further includes a spin motor assembly generally identified by reference numeral 36 and including a shaft 37 mounted on gimbal 32 and secured thereto by suitable means such as clamping brackets 38 and having its longitudinal axis substantially perpendicular to the output axis defined by bearings 24 and 26. The shaft 37 has a pair of intermediate portions of increased diameter adapted to fit within the inner races of a pair of rotor supporting bearings 40 and 41. Bearings 40 and 41 may be of any suitable type for the intended purposes and are adapted to have their outer races engage the rotor inertia element identified by reference numeral 43. Rotor element 43 is essentially a hollow cylindrically shaped element having its mid portion of somewhat increased cross-sectional area and has provided on its outer periphery a plurality of bucket-like indentations 44 shown in Figure 1. The buckets 44 are adapted to coact with fluid under pressure being discharged from a nozzle means 46 shown in Figure 3. The nozzle means 46 is a hollow tube-like member having its inner portion positioned adjacent to the periphery of the rotor element 43 and is mounted in the main housing portion 12 by being fitted into a suitable recess, the general longitudinal axis of the nozzle means 46 being such that when the fluid is discharged through the terminal end thereof it will impinge against the buckets 44 and thus impart rotation to the rotor element 43. The nozzle means 46 is adapted to be connected to a coupling or connector element 47 which may be of any suitable type and which may have a threaded portion 48 so as to provide a means for securing thereto by way of a cooperating fitting 49 (see Figure 5) on the end of a tubing or piping assembly so as to bring compressed fluid into the gyro.

A check-valve element 45 is provided to permit fluid to be discharged from the housing 12 when fluid is impinging on the rotor 43.

Referring again to Figure 4, the rotor element 43 has attached thereto on its inner periphery an armature element being identified by the reference numeral 50 and may be of any suitable type such as a hysteresis ring. The hysteresis ring or armature element 50 is adapted to coact with a rotating flux field so as to impart rotation to the rotor element 43. The rotating flux field is adapted to be produced by a stator element 52 which is adapted to be centrally positioned on the shaft 37 and which contains a magnetic core structure including a plurality of laminations 53 stacked together and wound with suitable winding means 54 which in turn are adapted to be connected by conventional means including leads 55 to a suitable source of electric current 56 so as to produce a rotating flux field. In general the electric motor means including the stator structure 52 and the armature element 50 may be of any suitable type adapted to rotate the rotor element 43 at a constant speed.

Figure 5:
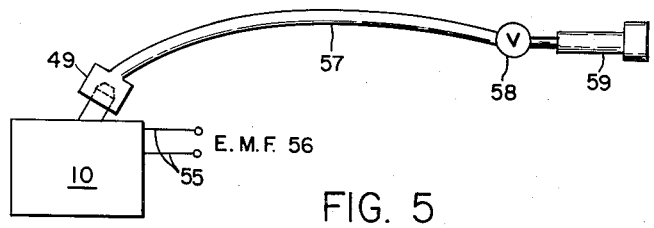
Figure 5 is a somewhat schematic view showing how an external supply of pressurized fluid is adapted to be connected to the gyroscope.

As indicated, the nozzle means 46 is adapted to be connected to a supply of pressurized fluid. As shown in Figure 5, the connector 49 adapted to coact with connector 48 may be connected to a piece of tubing or the like 57 which terminates at a suitable valve means 58 which is adapted to be selectively controlled so as to either be open or closed. The valve means is adapted to control the release of pressurized fluid from a container 59 which is the source of the pressurized fluid. Container 59 may be an element adapted to receive a cartridge of compressed fluid such as compressed nitrogen. Valve means 58 may be of any suitable type, the main requirement being that upon command the valve means 58 will be effective to release the fluid under pressure within the container 59 so as to permit it to be communicated through the tubing 57 to the nozzle 46 so as to be discharged against the rotor element 43. By proper design and selection of operating pressures the rotor element 43 can be brought from a standing start to extremely high speed operation in a very short period of time, such as, for example, less than one second. In some embodiments, it may be desired to have the container 59 and pressure release means 58 mounted on or in the housing for the gyro.

Shaft extension 34 of the gimbal assembly 30 has mounted thereon an armature member 60 of a signal generator or pickoff 61 which also includes a stator element 62. As shown the pickoff 61 is of the Microsyn type but it will be understood that any suitable pickoff may be provided such as electric, pneumatic, optical, or the like.

A pair of cross reeds 64 and 65 are provided for resiliently centering the gimbal assembly 30 about its output axis and for resiliently restraining the rotation of the gimbal assembly about the output axis. The cross reeds 64 and 65 are mounted each with one end thereof attached to suitable support portions 66 and 67 respectively of the first auxiliary housing member 16. The other ends of the cross reeds are connected by suitable means including bracket 68 to the shaft extension 34 of the gimbal assembly. It will be understood that any suitable type of resilient centering means may be provided for resiliently centering the gimbal assembly 30.

Damping means are also provided for the gyroscope disclosed and a magnetic damper has been illustrated. The magnetic damper includes a conductive cup-like element 70 having its end portion securely attached to a circular support member 71 which in turn is clamped by a nut 72 to the shaft extension 33 of the gimbal assembly.

The cup portion of the element 70 extends axially generally concentric with the output axis defined by bearings 24 and 26. The cup-portion of the element 70 coacts with a flux field produced by suitable permanent magnet means 77 and 78 which are mounted respectively on an axially inwardly extending stud portion 76 of the end wall 22 of the second auxiliary housing element 20 and on the inner periphery of the outer portion of the second auxiliary housing 20. The exact details of the magnetic damper means are not vital to an understanding of the present invention and accordingly will not be further disclosed here. It will be understood for rate gyro applications that it is desirable in some cases to have additional damping means and the means described above are indicative of this.

Figure 2:
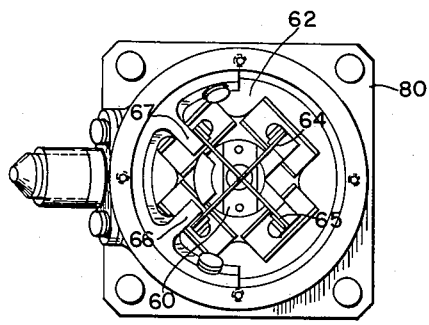
Figure 2 is a view of the device shown in Figure 1 as viewed along section lines 2—2 showing details of the resilient suspension of one end of the gimbal assembly.

A flange-like portion 80 having a general square plan view as shown in Figure 2 is provided for mounting purposes. Also a pair of end caps 85 and 86 are provided at opposite ends of the gyro 10 for sealing off the open ends of the auxiliary housings 16 and 20. End caps 85 and 86 when removed provide access to adjust, if necessary, the damping means and cross-reed centering.

Figure 6:
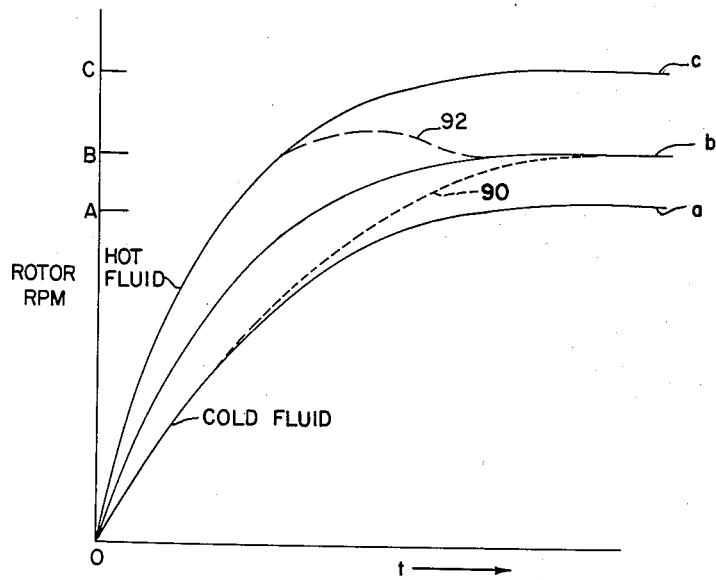
Figure 6 is a graph showing the rotor speed as a function of time as further influenced by the temperature of the supply of pressurized fluid.

As indicated above the speed at which the rotor element of the fluid driven gyroscope varies as a function of the applied pressure and that further the applied pressure is generally temperature sensitive. For example, a higher temperature would generally tend to make the pressure of the source of fluid higher and accordingly the velocity of the stream of fluid impinging against the rotor element would be greater so as to impart a greater rate of rotation to the rotor. The variation in rotor speed as a function of time and temperature is indicated in Figure 6. For illustrative purposes three specific levels of rotor r.p.m. has been designated by the reference letters A, B, and C. Level B represents the optimum or desired rotor r.p.m. and would be the rotor r.p.m. achieved by having fluid under a certain specified pressure available in container 59. The rotor would start from zero r.p.m. with time at zero and quite rapidly reach level B. This curve on the graph is identified by reference letter *b*. For higher temperatures the final terminal velocity as a result of the fluid under pressure would be a higher level C, this curve being identified by reference letter *c*. As explained, the higher temperature would cause a higher velocity of fluid impinging against the rotor element so as to cause the higher r.p.m. The other case would be for lower than normal temperatures causing a lower than normal pressure which in turn would cause a lower than normal velocity of fluid impinging against the rotor and accordingly a lower r.p.m. of the rotor would be achieved by the fluid propulsion means. This is indicated on the graph by level A and the r.p.m. vs. time curve is indicated by reference letter *a*. It will be understood that for many gyro applications such as a rate gyro application such a variation as is indicated in rotor r.p.m. could be very undesirable. It would not be uncommon to expect a variation of from 15 to 30% in final rotor r.p.m. as a result of the temperature effect in some system applications.

The present invention solves the problem of having a variation in rotor r.p.m. by having the auxiliary rotor impelling means, namely the motor means including the armature element 50 and the stator portion 52. As indicated the motor element is adapted to have a constant speed and according to the teaching of this invention the constant running speed of the electric sustaining motor means would be at level B as indicated in Figure 6 or in other words the idealized or desired terminal velocity of the rotor as a result of being impelled by the fluid from the nozzle means 46. In operation the valve means 58 would be controlled so as to permit the fluid to be released from the container 59 and to travel through the tube 57 to the nozzle 46 so as to impinge against the rotor and rapidly bring the rotor up to speed. For the case where the lower-than-normal temperature had caused a lower-than-normal pressure so that the rotor velocity as a result of the fluid means would tend to only reach level A, the electric motor means, also being energized either at or immediately after the valve 58 was actuated would be effective to continue to increase the rate of rotation of the rotor element 43 from the A level to the B level. This increase in motor rate of rotation from the A to the B level as a result of the electric means is indicated in Figure 6 by the dotted line 90. The other case is when a higher-than-normal temperature causes a higher-than-normal pressure and accordingly a higher-than-normal rotor r.p.m. which for the example given above is the C level. Figure 6 also depicts the coaction between the two motor driving means for this case by the dotted line 92. The dotted portion 92 shows how the rotor r.p.m. rapidly gets up to level B as a result of the higher-than-normal pressure and then tends to overshoot level B. At this point the rotor is being driven at faster than the synchronous speed of the sustainer electric motor means and accordingly the electric motor means tends to decelerate the rotor element 43. This is because the rotor element is traveling faster than the rotating flux field produced by the stator element 52. The electric motor means continues to decelerate the rotor element 43 until its rate of rotation is equal to the running speed of the electric motor means or, as depicted in Figure 6, to level B so that the rotor element is locked in at the running speed.

It will be understood that from the standpoint of designing an electric motor means which is the only source of impelling or imparting rotation to a rotor element that in order to have good starting torque and good running torque a fairly large motor has to be provided. It will be further understood that to provide a motor that merely provides sufficient torque to maintain or sustain rotation of a rotor element once it has been brought up to speed requires a substantially smaller motor element. One of the advantages of the present invention is that no appreciable sacrifice in size has to be made in the overall spin motor assembly. In other words, the diameter of the spin assembly is dictated for the most part by the desired amount of angular momentum that is required of the inertia, or rotor element 43. The auxiliary or sustainer electric motor means is contained within the envelope defined by the rotor element 43. This is in contrast to a much larger overall rotor assembly that would be required if the electric motor means by itself was the only means provided for starting the rotor element from a stalled or stopped condition and bringing it in a reasonable length of time up to full operating speed.

While we have shown and described a specific embodiment of this invention, further modifications and improvements will occur to those skilled in the art. It is desired to be understood therefore, that this invention is not limited to the particular form shown and we intend in the appended claims to cover all modifications which do not depart from the spirit and scope of this invention.

What we claim is:

1. In a gyroscope: support means; a rotor element; means including bearing means connected between said rotor element and said support means for rotatably mounting said rotor element for rotation about a spin axis; a first means for causing said rotor element to rotate about said axis, said first rotation producing means including nozzle means adapted to be connected to a source of fluid under pressure and positioned with respect to said rotor element so that fluid discharging from said nozzle means impinges said rotor element; and a second means for causing said rotor element to rotate about said axis, said second rotation producing means including a two-part electric motor means, one of said electric motor parts being on said rotor element, and the other of said electric motor parts being on said support means, said electric motor means being characterized by developing relatively low starting torque so as to be substantially ineffective to bring said rotor element up to operating speed from a starting condition and by developing sufficient running torque to maintain the momentum of said rotor element once said rotor element has attained an appreciable momentum.

2. In a gyroscope: support means; a rotor element; means including bearing means connected between said rotor element and said support means for rotatably mounting said rotor element for rotation about a spin axis; a first means for causing said rotor element to rotate about said axis, said first rotation producing means including nozzle means adapted to be connected to a source of fluid under pressure and positioned with respect to said rotor element so that fluid discharging from said nozzle means impinges said rotor element; and a second means for causing said rotor element to rotate about said axis, said second rotation producing means including a two-part synchronous electric motor means, one of said electric motor parts being on said rotor element and the other of said electric motor parts being on said support means, said first rotation means being effective when said nozzle means is connected to a suitable source of pressurized fluid to cause said rotor element to rotate about said spin axis at a rate exceeding the synchronous speed of said synchronous electric motor means, and said electric motor means being effective to decelerate said rotor element from said rate exceeding said synchronous speed to the level of said synchronous speed and thereafter to sustain the rate of rotation of said rotor element at said synchronous speed, said electric motor means being further characterized by developing relatively low starting torque so as to be substantially ineffective to bring said rotor element up to said synchronous speed from a stationary position.

3. In a gyroscope: support means; a rotor element; means including bearing means connected between said rotor element and said support means for rotatably mounting said rotor element for rotation about a spin axis; a first means for causing said rotor element to rotate about said axis, said first rotation producing means including nozzle means adapted to be connected to a source of fluid under pressure and positioned with respect to said rotor element so that fluid discharging from said nozzle means impinges said rotor element; and a second means for causing said rotor element to rotate about said axis, said second rotation producing means including a two-part synchronous electric motor means, one of said electric motor parts being on said rotor element, and the other of said electric motor parts being on said support means, said first rotation means being effective when said nozzle-means is connected to a suitable source of pressurized fluid to cause said rotor element to rotate about said spin axis at a rate substantially the same as the synchronous speed of said synchronous electric motor means, and said electric motor means being effective to sustain the rate of rotation of said rotor element at said synchronous speed subsequent to termination of fluid discharging from said nozzle means, said electric motor means being further characterized by developing relatively low starting torque so as to be substantially ineffective to bring said rotor element up to said synchronous speed from a stationary position.

References Cited in the file of this patent

FOREIGN PATENTS

| | | |
|---|---|---|
| 529,751 | Great Britain | Nov. 27, 1940 |
| 122,639 | Australia | Oct. 29, 1946 |